June 16, 1959     J. W. SPISELMAN     2,890,870
APPARATUS FOR CONTACTING LIQUIDS AND GASES
Filed Oct. 23, 1957     4 Sheets—Sheet 1
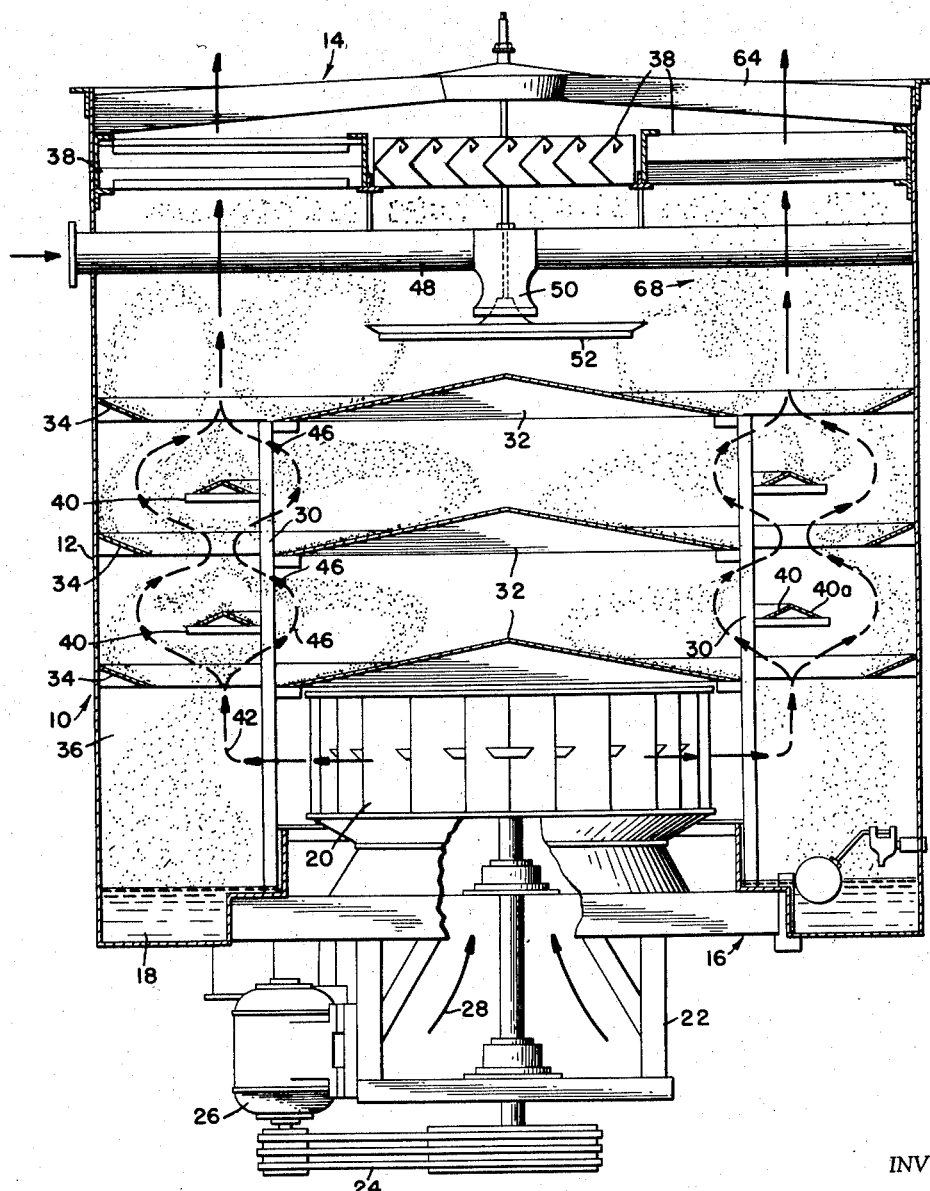
INVENTOR
JOSEPH W. SPISELMAN
BY Harold T. Stowell
    Harold L. Stowell
ATTORNEY June 16, 1959   J. W. SPISELMAN   2,890,870
APPARATUS FOR CONTACTING LIQUIDS AND GASES
Filed Oct. 23, 1957   4 Sheets-Sheet 2
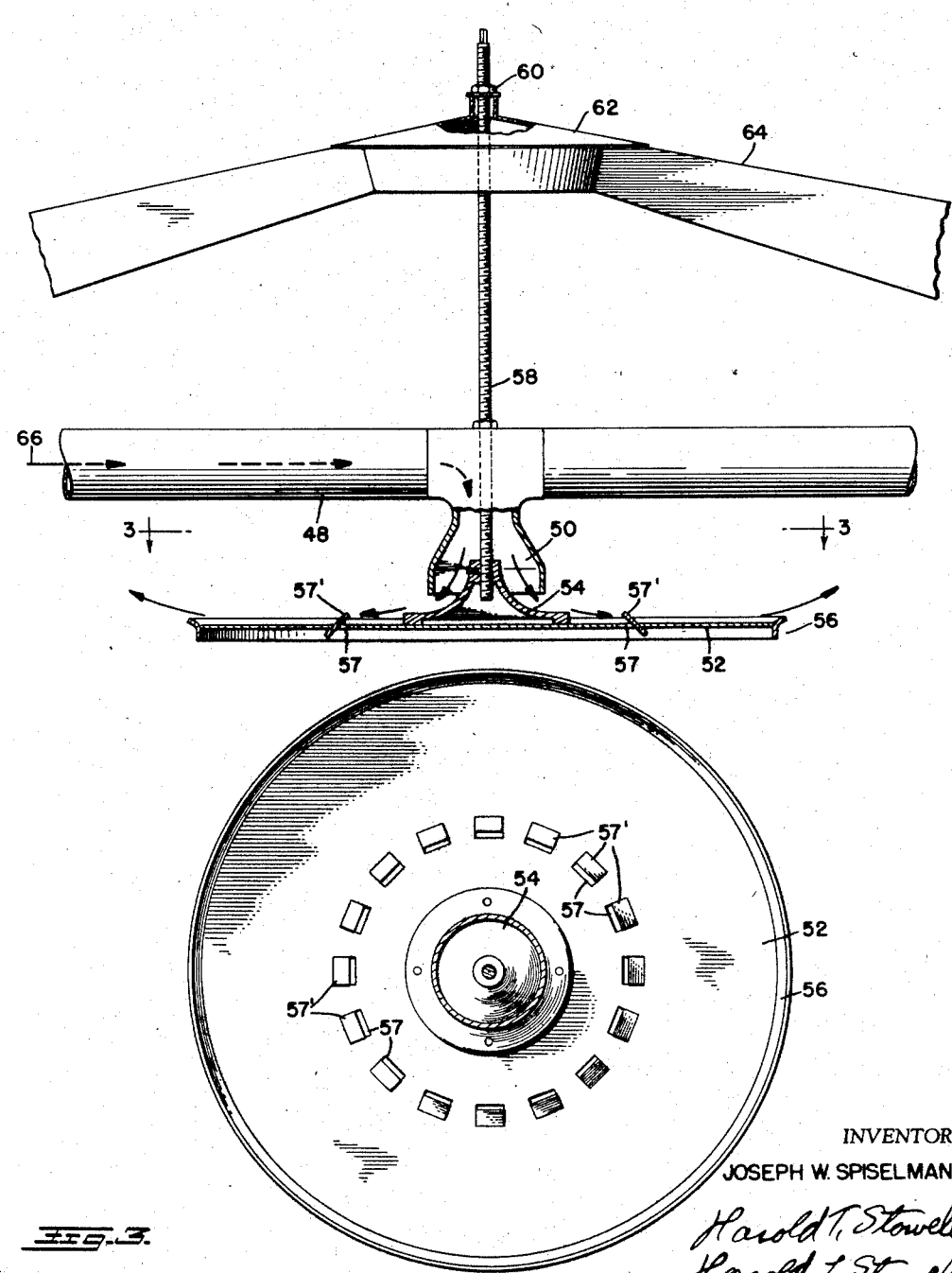
INVENTOR
JOSEPH W. SPISELMAN
Harold T. Stowell
Harold L. Stowell
ATTORNEY

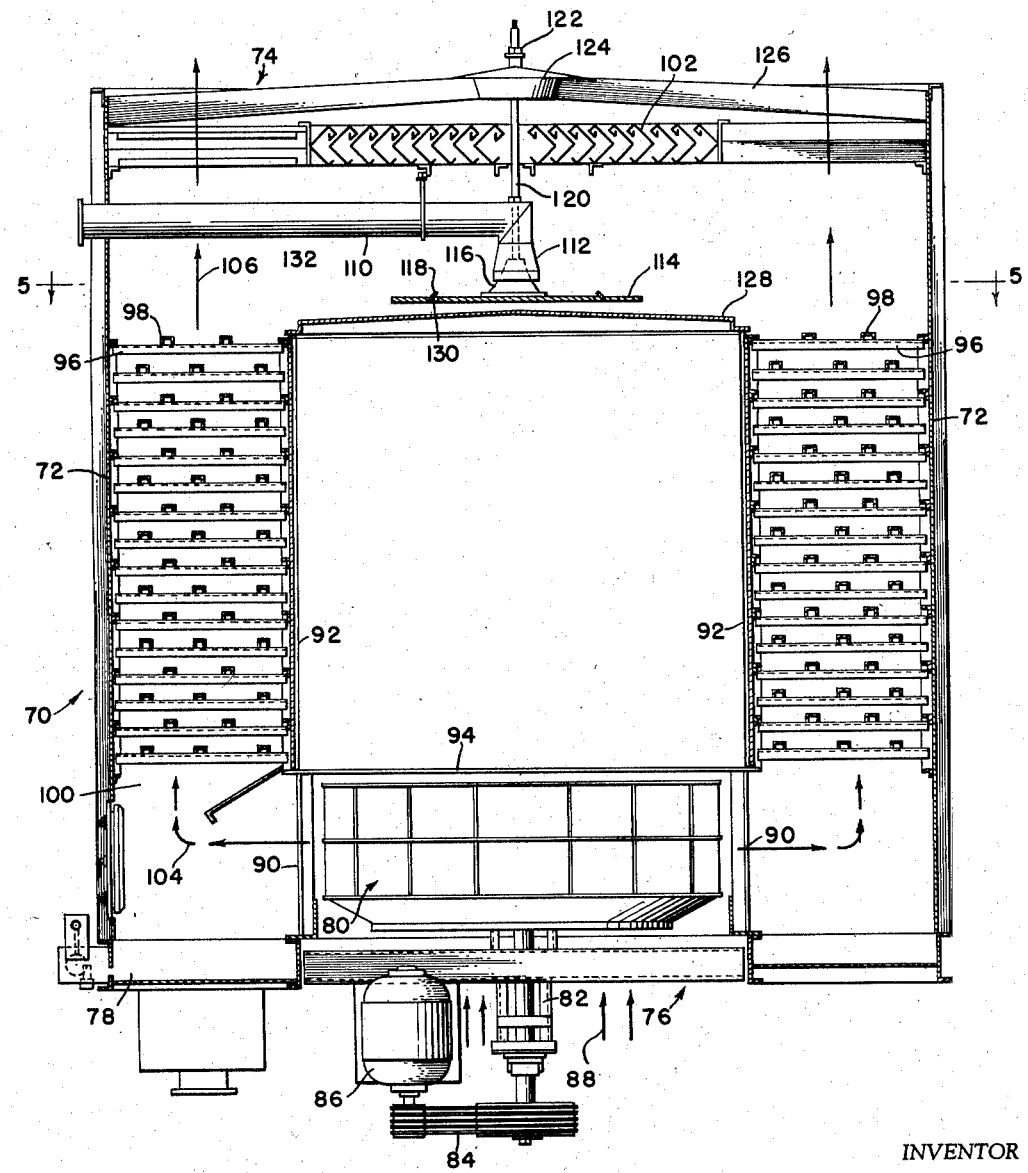

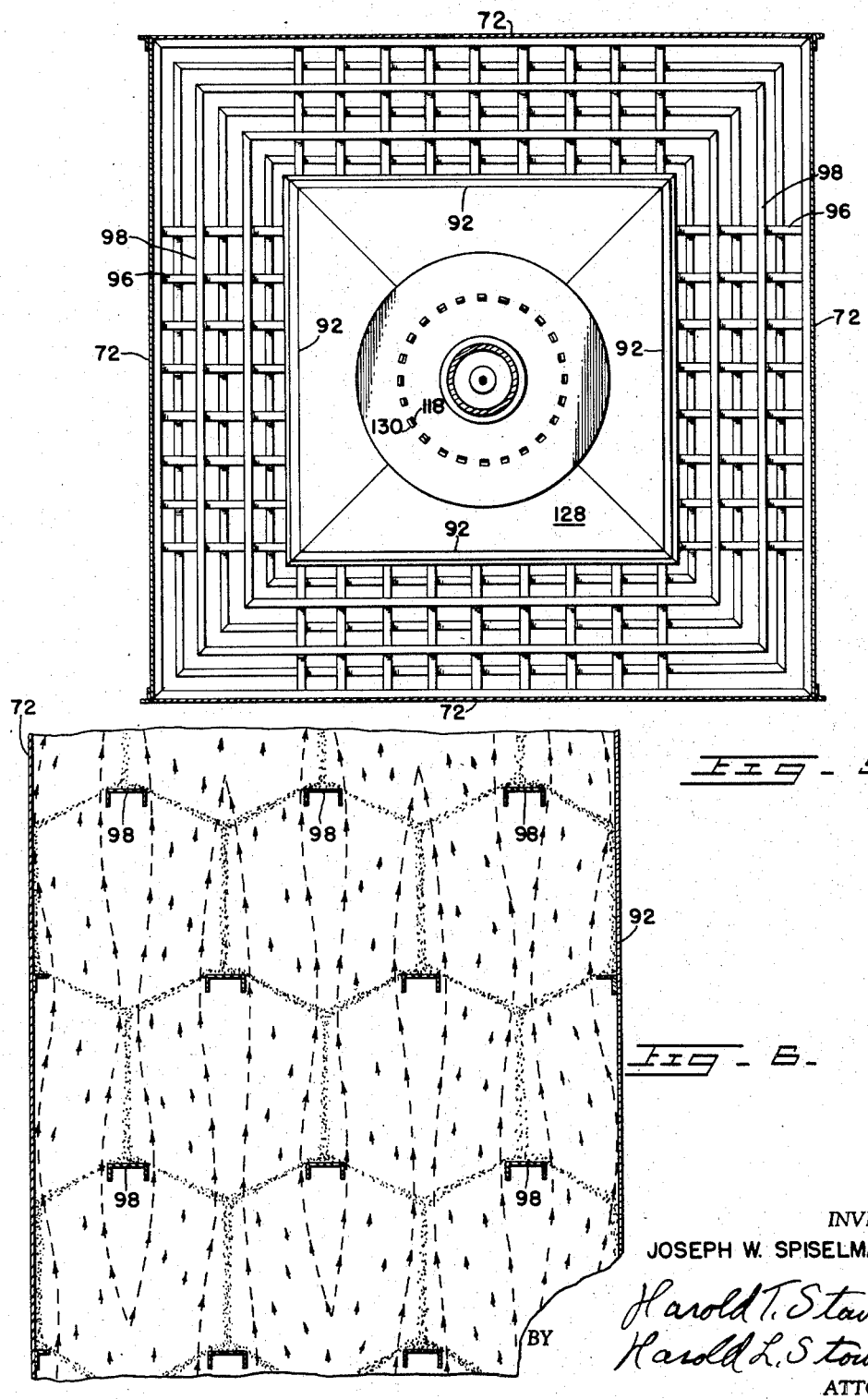

United States Patent Office 2,890,870
Patented June 16, 1959

2,890,870

APPARATUS FOR CONTACTING LIQUIDS AND GASES

Joseph W. Spiselman, Brooklyn, N.Y.

Application October 23, 1957, Serial No. 691,850

2 Claims. (Cl. 261—30)

The present invention relates to apparatus for the efficient contacting of gases and liquids and more particularly and specifically to new and improved apparatus for the cooling of water by the evaporative cooling effect of an air current passing in contact therewith as, for example, liquid cooling towers associated with air conditioning installations.

It is recognized that the efficiency of evaporative cooling of water by utilization of a current of air passing in contact with the water is directly dependent upon the extent of surface area of the water which is exposed to contact by the passing air.

It is also recognized that to obtain the maximum cooling effect, it is desirable to divide the water into droplets and to direct them so as to provide counter-current flow between the water and the cooling air current.

Certain conventional constructions have advanced the art by providing apparatus which produces counter-current flowing air currents and subdivided water particles with substantial control over air velocities and water drops to take advantage of increased cooling obtainable at "equilibrium velocities." These conventional water cooling constructions have employed means to pass the water in successive downward paths across a generally upward moving current of air to achieve "equilibrium velocities" between the counter-flowing air and water while maintaining a minimum pressure drop in the air current and saving space within the apparatus. One such prior construction which includes these conventional structural advantages is disclosed in United States Letters Patent No. 2,350,590, issued to Stewart C. Coey, on June 6, 1944.

Conventional cooling apparatus of the type recognized above include a vertical, enclosed tower, a vertical, annular air passage concentrically within the outer wall of the tower, fan means for directing an air current vertically of the passage to be discharged through a moisture collecting eliminator at the upper end of the tower, a water trough annularly about the upper perimeter of the tower provided with slots for distributing water by gravity angularly across the upper end of the air passage, a plurality of alternately arranged inclined platforms on either side of the air passage for successively collecting and redirecting the water across the air path downwardly through its length, and a reservoir at the lower end of the passage for collecting the cooled water.

I have discovered that there are numerous disadvantages in these conventional cooling structures. For example, in the water supply arrangement the tower must be absolutely level to insure an even distribution of water from the discharge slots in the supply trough. Further, water entering the air passage from the trough slots has substantially no velocity thereby requiring a very high air velocity (±1500 f.p.m.) in the uppermost water pass in order to carry, or float, the water film or droplets across the air path to the second stage collector and redistributor. This requirement for high air velocity in the upper regions of the tower necessitates large and costly fan equipment and at the same time, reduces the collection efficiency of the eliminator at the air outlet.

Still further, structural difficulties arise in the provision of annular water distribution troughs since it becomes necessary to assemble the troughs from plural segments which must coincide and be joined to form a continuous liquid trough. Further difficulties arise in the water trough where covers and baffles must be placed at given points to avoid spill-over and wave effects in the water supply.

I have discovered and it is a general object of this invention to provide, structural improvements over prior conventional cooling apparatus which eliminate substantially all of these problems and disadvantages.

A primary object of the present invention lies in the provision of a new and improved water cooling apparatus operating on an evaporative cooling effect of the water by a counter-flowing current of air which provides substantially improved control over the water and air flow within the apparatus to produce a water cooler of maximum efficiency.

Another object of this invention lies in the provision of improved water cooling apparatus in which the water is introduced from a central source where it is diffused to subdivide the water into particles or droplets and evenly distribute it to all areas of a counter-flowing air current thereby eliminating exacting levelling requirements for the housing tower.

Still another object of this invention is the provision of water cooling apparatus utilizing counter-flowing water and air currents wheren the water is introduced in such a manner as to provide the water with an initial velocity in the first pass at the top of the housing tower greater than gravity thereby greatly reducing the required air velocity in this pass necessary to achieve "equilibrium velocities" and thereby reducing size requirements of fan equipment and increasing the collection efficiency of the water eliminator in the air outlet.

A still further object of this invention is the provision of water cooling apparatus of the type defined wherein the improved structures provide for improved control of cooling air currents in the apparatus in such a manner as to produce successive zones wherein the air flow is divided into diverging-converging streams which serve to increase the extent of water surface contact in a minimum of space requirement for the purpose of greatly increasing the cooling efficiency of the apparatus.

A still further object of this invention is the provision of new and improved water cooling apparatus of the type described wherein the costs of construction and operation are greatly reduced over prior apparatus of the same type and in which efficiencies are greatly increased over the same prior devices.

Still further objects and advantages of this invention will become more readily apparent to those skilled in the art when the following general statement and description are read in the light of the accompanying drawings.

The nature of the present invention may be stated in general terms as relating to water cooling apparatus in which the water is cooled by the evaporative effect obtained from a counter-flowing current of air including a vertical tower, a vertical annular air passage concentrically within the outer wall of the tower, fan means for directing a current of air substantially vertically through said passage, a water inlet centrally of the upper end of said tower, a concave diffuser spaced below said water inlet upon which the incoming water impinges and is redirected in a finely subdivided condition concentrically outwardly from the diffuser across the upper end of said annular air passage, baffles located centrally in said air passage in vertically spaced relationship for producing successive zones wherein the air flow is divided into diverging-converging streams within said passage, water directing members projecting concentrically into said air passage at spaced distances above and below each of said baffles for distributing said water across said divided streams adjacent their points of convergence, and reservoir means in the lower end of said passage for collecting the water.

Referring now to the appended drawings in which similar numerals designate like parts throughout the several views.

Fig. 1 is a vertical section through water cooling apparatus constructed in accordance with the present invention.

Fig. 2 is an enlarged fragmentary section through the water supply apparatus.

Fig. 3 is a horizontal section taken on line 3—3, Fig. 2.

Fig. 4 is a vertical section through water cooling apparatus constructed in accordance with the present invention embodying a modified form of the apparatus illustrated in Fig. 1.

Fig. 5 is a sectional view of the water cooling apparatus taken along line 5—5 of Fig. 4.

Fig. 6 is an enlarged fragmentary view showing typical water and air paths within the apparatus of Fig. 4.

The water cooling apparatus illustrated in the accompanying drawings includes a vertical tower 10 having a cylindrical side wall 12, a generally open top 14 and a centrally dished bottom 16 providing an annular liquid receiving reservoir 18 concentrically within the outer side wall 12. A rotary fan 20 is mounted inwardly of the bottom wall on a suitable framework 22 and is driven through a conventional drive means 24 by a motor 26. The fan 20 is located within the tower above the level of the top of the annular reservoir 18 thereof and takes suction vertically through the open central portion of the dished bottom wall as at 28.

The tower is provided interiorly with uprights 30 which are equally spaced from the outer wall 12 radially of the tower and which extend from a position of support on the bottom wall of the tower vertically to terminate at a spaced distance below the upper open end of the tower. These uprights support a plurality of conical plates 32 concentrically within the tower in equally vertically spaced relationship above the fan 20. The apex portions of conical surfaces of plates 32 are upwardly disposed. A plurality of ring members 34, which are inclined from their outer periphery downwardly to the peripheral edge of their central opening, are secured to the inner face of the side wall 12 of the tower, one ring in concentric alignment with each of the conical plates 32 with the lower inner periphery of the rings being horizontally aligned with the outer peripheral edge of the plate.

A generally rectilinear air passage 36 is formed annularly within the outer wall 12 of the tower between the inner face of the outer wall 12 and the outer peripheral edges of the conical plates 32. The upper end of this air passage opens through the open upper end 14 of the tower wherein hook type moisture collecting eliminators 38 are mounted horizontally of the tower and through which air discharging from the air passage 36 passes. Associated with the annular air passage 36 is a plurality of baffles 40 which take the form of rings supported from the uprights 30 substantially concentrically within the air passage with one of said baffles being located equidistant between each successive pair of conical plates vertically of the tower. The baffles 40 are triangular in cross section with the apex centered in the annular gas passage whereby faces 40a and 40b provide collection surfaces for water particles and redistribute the collected liquid into the gas stream as to be more fully described hereinafter.

By the foregoing construction air drawn into the fan 20 (as at 28) is discharged laterally into the lower extremity of the air passage 36 as at 42, where it is propelled generally vertically through the passage and outwardly as at 44 through the moisture eliminator 38 in the upper end of the tower. The air current passing vertically through the passage 36 will be induced by the baffles 40 to assume zones wherein the air is divided into diverging-converging streams, as at 46, around the baffles intermediate the successive vertically spaced plates 32 and ring members 34. The points which the divided air stream converge will occur in substantially horizontal coincidence with the aligned peripheral edges of the ring members 34 and their corresponding conical plates 32.

Extending transversely of the upper end of the tower at a spaced distance below the eliminators 38 is a water delivery pipe 48 which is provided on the axial centerline of the tower with a downwardly disposed delivery nozzle 50. Associated with the nozzle 50 is a diffuser plate or dish 52 which includes a substantially flat circular dish having a central conical hub portion 54 immediately beneath the nozzle outlet and an upwardly inclined peripheral lip 56. A threaded rod 58 is secured in the central hub 54 to extend vertically through the nozzle and supply pipe 48 for adjustably threaded connection as at 60 in the central hub 62 of a spider frame 64 which braces the side wall 12 of the tower in the open upper end thereof. By the adjustable mounting of the rod 58 the diffuser plate 52 may be selectively adjusted vertically relative to the open mouth of the supply nozzle 50.

By varying the spaced relation between the nozzle outlet 50 and the hub portion 54 the velocity and the volume of the liquid directed to the central diffuser plate may be effectively controlled without upsetting the even distribution of liquid into the gas stream being cooled.

The diffuser plate is provided with a plurality of outlets or weep holes 57 positioned concentrically with the hub portion 54 between the hub and the lip 56. The outlets or slots 57, as more clearly shown in Fig. 1, distribute liquid directly to the uppermost plate 32. In order to insure that a predetermined portion, approximately ⅓, of the liquid directed to the diffuser plate issues through outlets 57, the openings are preferably in the form of slots, having fluid directing baffles 57′ secured to the edge downstream to the hub portion 54.

Very satisfactory results have been obtained with a diffuser plate having the following dimensions:

| | |
|---|---|
| Diameter of diffuser plate _____inches__ | 60 |
| Projection of lip 56 above the upper surface of the plate _____inch__ | about ¼ |
| Number of slots, spaced 22½° on center _____ | 16 |
| Length of slots _____inches__ | 2¾ |
| Width of slots _____do____ | 1½ |
| Projection of slot baffle above the upper surface of the plate _____inch__ | 1 |
| Distance of baffle from the center of the plate _____inches__ | 15 |

In operation of the diffuser water to be cooled is supplied under pressure as at 66 to the supply pipe 48 from an external source whereupon it is discharged from the nozzle 50 against the conical surface of the central hub 54 of the diffuser plate 52 which directs about ⅔ of the water outwardly across the plate surface against the upwardly inclined peripheral lip 56 whereupon it is directed as a droplet spray 68 outwardly across the flow of air from the air passage 36 at a point above the uppermost conical plate 32 and its associated side wall supported ring member 34.

As hereinbefore described, the other portion of the liquid directed to the plate 52 passes through openings 57′ and is dispensed to the uppermost plate 32.

By referring to Fig. 1, it may be seen that the subdivided water directed from the diffuser 52 into the upper end of the air stream will be divided by the air stream as the stream contacts the surface areas of the droplets of water forming the spray so that portions of the water spray will be blown outwardly toward the side wall of the tower to precipitate by gravity onto the inclined surface of the uppermost ring member 34 from which they will be redirected from the lower innermost peripheral edge of the ring back into the air passage 36 across one of the divided air streams immediately beneath said ring member, while at the same time, a second portion of the spray will be blown inwardly of the tower to be precipitated with the liquid from the weep holes 57 upon the upper surface of the uppermost conical plate 32 which in turn will redirect the water back across the second of the divided air streams at a point radially opposite the discharge of the ring member 34.

As the water droplets are redirected by the conical plate 32 and the ring member 34 into the converging air streams immediately therebeneath such water will again be divided with a portion thereof being impelled outwardly of the center of the divergent air flow and with a second portion being impelled inwardly within the eye of the divided air streams. This division of the film of water by the divergent action of the air flow so divides the water as to provide for a substantial increase in surface area contact by the air flowing through the passage 36. As more clearly shown in Fig. 1, a portion of the liquid particles within the divergent air streams brings about surface cooling therein. The other portion of the liquid particles precipitate upon the surfaces 40a and 40b and are redistributed into the gas streams from the lower edges thereof. This increased surface area contact between the counter-flowing air stream and the film of water greatly increases the cooling efficiency within each pass of the cooling apparatus without necessitating increase in space requirements.

The aforedescribed action of the water film is successively repeated vertically downwardly through the air passage until the water is discharged from the lowermost pass into the reservoir portion 18 of the tower bottom from which it is drawn by suitable apparatus, not shown, for utilization in air conditioning apparatus.

It is, of course, contemplated that a conventional recirculating system can be employed so as to return water collected within the reservoir portion 18 of the tower to the supply pipe 48 for additional cooling treatment.

Referring to Fig. 4, there is shown water cooling apparatus including a verical tower 70 having rectangular sides 72, a generally open top 74 and a bottom 76 providing a liquid receiving reservoir 78. A rotary fan 80 is mounted inwardly of the bottom wall on a suitable framework 82 and is driven through a conventional drive means 84 by a motor 86. The fan 80 is located within the tower above the level of the top of the reservoir 78 thereof and takes suction vertically through the open central portion of the bottom wall as indicated at 88.

The tower is provided interiorly with upright members 90 which are equally spaced from the outer walls 72 and extend from a position of support on the bottom wall of the tower vertically to terminate in a supporting position for an inner curtain assembly. The inner curtain assembly includes vertical side wall portions 92 and a bottom wall 94. The side walls 92 of the inner curtain assembly and the inner surface of the sides 72 of vertical tower 70 cooperate to support the ends of supporting channels 96. A plurality of collecting channels 98 are provided to be supported on the channels 96. Each of the collecting channels 98 is adapted to extend about the inner curtain assembly at an equidistance therefrom. The apparatus is formed in such a manner that there are a plurality of superposed sets of channels 96 and 98. It will be noted that each set of collecting channels 98 is so arranged that the adjacent sets are in staggered relation as will be discussed in greater detail hereinafter.

A generally rectangular air passage 100 is formed within the outer walls 72 of the tower 70 between the inner surface of the outer walls 72 and the outer surfaces of the side wall portions 92. The upper end of this air passage opens through the open upper end 74 of the tower wherein hook-type moisture collecting eliminators 102 are mounted horizontally of the tower and through which air discharging from the passage 100 passes. Associated with the air passage 100 the collecting channels 98 causes the vertically moving air to assume paths as indicated generally by the arrows in Fig. 6. The top of the collecting channels 98 provides collection surfaces for water particles and redistributes the collected liquid into the gas stream as will be more fully described hereinafter.

Within the described construction, air drawn into the fan 80, generally shown by the arrows 88, is discharged laterally into the lower extremity of the air passage 100, as at 104, where it is propelled generally vertically through the passage assuming the paths as indicated by the arrows in Fig. 6 and outwardly as at 106 through the moisture eliminator 102 in the upper end of the tower 70. It will be noted that the air current passing vertically upward through the passage 100 will be caused by the channels 98 to travel within zones wherein the air is divided into a plurality of diverging-converging streams, as at 108, around the channels 98. The zones in which the divided air streams converge will occur in substantially horizontal coincidence slightly below the horizontal plane of the channels 98.

Extending transversely of the upper end of the tower 70 at a spaced distance below the eliminators 102 is a water delivery pipe 110 which is provided on the axial centerline of the tower with a downwardly disposed delivery nozzle 112. Associated with the nozzle 112 is a diffuser plate 114 which includes a substantially flat circular plate having a central conical hub portion 116 immediately beneath the nozzle outlet and an upwardly inclined lip 118. A threaded rod 120 is secured in the central hub 116 and extends upwardly through the nozzle and the supply pipe 110 for adjustably threaded connection as at 122 in the central hub 124 of a spider frame 126 which braces the side walls 72 of the tower in the open upper end thereof. By the adjustable mounting of the rod 120, the diffuser plate 114 may be selectively adjusted vertically relative to the open mouth of the supply nozzle 112.

Disposed in spaced relation beneath the diffuser plate 114 there is a pyramidal plate 128.

By varying the spaced relationship between the nozzle outlet 112 and the hub portion 116, the velocity and the volume of the liquid directed to the diffuser 114 may be effectively controlled without upsetting the even distribution of liquid into the gas stream being cooled.

The upturned lips 118 of the diffuser plate 114 provide a plurality of associated slots 130 which act to distribute liquid directly to the upper surfaces of the plate 128. In order to insure that a predetermined portion, approximately ⅓ of the liquid directed to the diffuser plate 114 issues through the slots 130, the openings are preferably in the form of slots, having the upturned lips 118.

In operation, the diffuser water to be cooled is supplied under pressure through the supply pipe 110 from an external source and is discharged from the nozzle 112 against the conical surface of the central hub 116 of the diffuser plate 114 which is adapted to direct about two-thirds of the water outwardly across the plate surface to the periphery thereof where it is directed as a droplet spray 132 outwardly across the flow of air from the air passage 100 at a point above the uppermost series of collecting channels 98 toward the inner surface of the sides 72. The other portion of the liquid directed to the diffuser plate 114 passes through the openings 130 and is dispensed on the upper surface of the plate 128.

It will be clear from examination of Fig. 4 that the water directed from the diffuser 114 into the upper end of the air stream will be divided by the air stream as the stream contacts the surface areas of the droplets of water forming the spray so that the entire quantity of the water to be cooled will be directed so as to achieve a substantially uniform distribution of water across the zone defined by the walls 72 and the wall portions 92 of the tower. The water will then precipitate by gravity onto the various collecting channels 98 of the uppermost array and will thence be directed downwardly to the next lower array of collecting channels 98 which are in staggered relation with respect to the upper array. This structural arrangement permits a substantial portion of the water droplets during their travel from one array of collecting channels to the next lower array to substantially float across the air stream, as shown in greater detail in Fig. 6, providing for maximum heat transfer within the zone of the cooling tower 70. It will be appreciated that immediately downstream each of the channels 98 there is formed a relatively dead air zone which permits the previously collected droplets from the channels immediately above to drop on the lower collecting channel and coalesce. This action averages out the cooler droplet skin temperature with the warmer core temperature of the droplets. Then the layer of coalesced droplets formed on the collecting channels will be directed back into the air stream to be reformed into droplets and repeat the above process a number of times depending upon the number of arrays of collecting channels employed. Manifestly, the increased surface area contact between the counterflowing air stream and the film of water greatly increases the cooling efficiency within each complete cycle or path of the cooling apparatus without the necessity of increasing the physical dimensions of the cooling tower.

The above procedure of the water droplets collecting on the collecting and coalescing on the collecting channels 98 and thence being redirected into the counterflowing air streams is repeated until the water reaches the reservoir portion 73 in the bottom of the tower. The water may then be recirculated or drawn off for utilization in auxiliary apparatus such as an air conditioning or cooling system.

While the apparatus constituting the present invention has been particularly described for the purpose of illustration with reference to the cooling of water by an air stream, the advantages of the present invention are not so restricted since it is contemplated that they are generally adaptable to apparatus for the contacting of gases and liquids for any one of a number of purposes such as gas washing, humidification and dehumidification.

It will be further understood that while the present invention has been specifically described with reference to a cooling tower having a cylindrical shape other than round towers may be advantageously used, such as square or polygonal towers having circular central diffuser plates.

This is a continuation-in-part of my application Serial No. 553,264, filed December 15, 1955, now abandoned.

Having thus described and explained the improved structures embodied in my invention and the objects and advantages thereof which serve to produce new and useful results, what I desire to claim is:

1. A liquid cooling tower comprising a housing, means for introducing liquid to be cooled into the top of said housing, a plurality of vertically spaced sets of baffle members, each set comprising a first horizontally extending baffle member disposed adjacent the inside of the outer wall of said housing and a second baffle member disposed centrally of and spaced from said first baffle member, thereby defining an annular passage between the baffle members of each set, said plurality of annular passages defining a cylindrical gas-liquid contact zone extending generally from the bottom to the top of said housing, the adjacent edges of said baffle members of each set lying in the same horizontal plane, an additional plurality of annular baffle members disposed within said annular gas-liquid contact zone, each of said annular baffle members being disposed midway between the horizontal planes of adjacent ones of said baffle sets and coincident radially with the annular passages, and means for introducing a current of gas to flow upwardly through said baffle members to cause said gas to flow in a plurality of converging-diverging paths.

2. A liquid cooling tower according to claim 1 wherein the first baffle member of each of said sets extends inwardly and downwardly away from the side wall of said housing, and the second baffle member of each of said sets extends outwardly and downwardly away from the central portion of said housing.

References Cited in the file of this patent
UNITED STATES PATENTS

| | | |
|---|---|---|
| 132,585 | Jones | Oct. 29, 1872 |
| 413,514 | Jarrell | Oct. 22, 1889 |
| 656,902 | Moore | Aug. 28, 1900 |
| 677,749 | Swendeman | July 2, 1901 |
| 2,349,777 | Utterback et al. | May 23, 1944 |
| 2,585,440 | Collins | Feb. 12, 1952 |
| 2,639,947 | Tramm et al. | May 26, 1953 |

FOREIGN PATENTS

| | | |
|---|---|---|
| 263,114 | Great Britain | Aug. 11, 1927 |
| 473,900 | Great Britain | Oct. 21, 1937 |
| 499,855 | Germany | June 17, 1930 |